(12) United States Patent
Riegger et al.

(10) Patent No.: US 12,172,504 B2
(45) Date of Patent: Dec. 24, 2024

(54) WINDING SHAFT BEARING OF A VEHICLE ROLLER BLIND DEVICE

(71) Applicant: Webasto SE, Stockdorf (DE)

(72) Inventors: Marian Riegger, Stockdorf (DE); Bernhard Braun, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 160 days.

(21) Appl. No.: 17/791,419

(22) PCT Filed: Feb. 1, 2021

(86) PCT No.: PCT/EP2021/052258
§ 371 (c)(1),
(2) Date: Jul. 7, 2022

(87) PCT Pub. No.: WO2021/156176
PCT Pub. Date: Aug. 12, 2021

(65) Prior Publication Data
US 2023/0030300 A1    Feb. 2, 2023

(30) Foreign Application Priority Data
Feb. 3, 2020    (DE) .................. 10 2020 102 615.3

(51) Int. Cl.
*B60J 3/02*    (2006.01)
*B60J 7/00*    (2006.01)

(52) U.S. Cl.
CPC .................. *B60J 7/0015* (2013.01)

(58) Field of Classification Search
CPC .................................... B60J 7/0015
USPC ........................................ 296/214
See application file for complete search history.

(56) References Cited

U.S. PATENT DOCUMENTS

| 2015/0159432 A1 | 6/2015 | Park |
| 2020/0207193 A1 | 7/2020 | Dietl et al. |

FOREIGN PATENT DOCUMENTS

| CN | 204782664 U | 11/2015 |
| DE | 202018100220 U1 | 1/2018 |
| DE | 102017111358 A1 | 11/2018 |
| DE | 102018101557 A1 | 2/2019 |

OTHER PUBLICATIONS

International Search Report for PCT/EP2021/052258 mailed Apr. 20, 2021, in English and German (6 pages).
Parent Application No. DE 10 2020 102 615.3; Examination Report dated Oct. 8, 2020. (In German with English machine translation).

*Primary Examiner* — Dennis H Pedder
(74) *Attorney, Agent, or Firm* — Fitch, Even, Tabin & Flannery, LLP (57) ABSTRACT

A winding shaft bearing of a winding shaft for a vehicle roller blind having a roller blind web, wherein the winding shaft bearing has a guide unit which guides a roller blind edge strip of the unwound roller blind web to a guide rail adjoining the winding shaft bearing. According to the invention: the guide unit has a guide front portion facing the winding shaft and a guide main portion facing the guide rail; a guide contact surface of the guide main portion guiding the roller blind edge strip to the guide rail is elevated with respect to a guide contact surface of the guide front portion guiding the roller blind edge strip from or to the winding shaft; and the winding shaft bearing is formed integrally with the guide front portion and the guide main portion of the guide unit as a plastic injection-moulded part in an injection-moulding tool.

11 Claims, 10 Drawing Sheets

WINDING SHAFT BEARING OF A VEHICLE ROLLER BLIND DEVICE

CROSS-REFERENCE TO RELATED APPLICATION

This application is a U.S. national phase application filed under 35 U.S.C. § 371 of International Application No. PCT/EP2021/052258, filed Feb. 1, 2021, designating the United States, which claims priority from German Patent Application Number DE 10 2020 102 615.3, filed Feb. 3, 2020, which are hereby incorporated herein by reference in its entirety for all purposes.

FIELD

The invention relates to a winding shaft bearing of a winding shaft of a vehicle roller blind device, said winding shaft carrying a roller blind web, wherein the winding shaft bearing has a guide unit which guides a roller blind edge strip of the unwound roller blind web to a guide rail adjoining the winding shaft bearing. The invention further relates to an injection-molding tool for injection-molding such a winding shaft bearing.

BACKGROUND

A generic winding shaft bearing of a winding shaft of a vehicle roller blind device has been disclosed in DE 20 2018 100 220 U1. A guide unit in the form of a guide element guides the lateral edge of the roller blind web onto a guide rail and into a guide channel of the guide rail. The guide element is a separate component which is fastened to a bearing element of the winding shaft bearing, for example by being plugged or screwed thereon. The guide element is formed, in particular, as an injection-molded part, wherein a parting line of the injection-molding tool runs in such a manner that a resulting parting burr does not pass through a guide surface or contact surface with the roller blind web when the guide element is attached to the bearing element of the winding shaft bearing. Undercuts, which might be necessary with a one-piece design of the bearing element and the guide element, are intended to be avoided by means of this design during the injection-molding of the bearing element.

SUMMARY

The object of the invention is to provide a winding shaft bearing, as mentioned in the introduction, which is improved regarding the design of the guide unit, as well as an injection-molding tool for injection-molding such a winding shaft bearing.

The object is achieved in the winding shaft bearing according to the invention, which is mentioned in the introduction, in that the guide unit has a guide front portion facing the winding shaft and a guide main portion facing the guide rail, in that a guide contact surface of the guide main portion guiding the roller blind edge strip to the guide rail is elevated with respect to a guide contact surface of the guide front portion guiding the roller blind edge strip from or to the winding shaft, and in that the winding shaft bearing is formed integrally with the guide front portion and the guide main portion of the guide unit as a plastic injection-molded part in an injection-molding tool.

The object is further achieved by an injection-molding tool for injection-molding such a winding shaft bearing, wherein the injection-molding tool has a rotary slide or oblique slide for molding the guide main portion of the guide unit formed by an undercut and, in particular, the guide contact surface of the guide main portion guiding the roller blind web or the roller blind edge strip.

Advantageous embodiments of the invention are specified in the dependent claims.

In the winding shaft bearing according to the invention, therefore, at least two differently designed functional regions or guide regions of the guide unit may be injection-molded integrally with the winding shaft bearing as a structural unit. The two functional regions in the form of the guide front portion and the guide main portion may be arranged so as to adjoin one another, but are expediently arranged separately from one another such that they may be produced or injection-molded by means of different slides or tool parts of an injection-molding tool. Since a guide contact surface of the guide main portion guiding the roller blind edge strip onto the guide rail is elevated relative to a guide contact surface of the guide front portion guiding the roller blind edge strip from or to the winding shaft, this results in a clearly defined separation which at the same time represents a transition having a height difference or height offset. The functional regions or guide regions contain sliding surfaces on which the roller blind edge strip is unfolded from its position placed flat on the winding shaft and, in particular, its folded position, and together with a guide strip attached to the roller blind edge strip is moved into a position in which the roller blind edge strip may be transferred with the guide strip to an assigned guide, such as for example to a guide channel of the guide rail. The guide contact surface of the guide main portion and the guide contact surface of the guide front portion represent such sliding surfaces, wherein the guide contact surfaces may be shaped, for example, to be planar, curved or bulged and in each case may be formed as a contiguous surface or as at least two separate surfaces.

According to a preferred embodiment, it is provided that at least one transition region, which is without contact with the roller blind edge strip, is formed between the guide contact surface of the guide front portion and the guide contact surface of the guide main portion. Such a transition region without contact is formed, in particular, at the height difference or height offset between the guide contact surface of the guide main portion and the guide contact surface of the guide front portion. The injection-molding tool may be designed such that a parting line which may be formed, in particular, between the slides of the injection-molding tool on the guide unit of the winding shaft bearing and which is associated with an inherently undesirable material accumulation in the form of a parting burr, runs in such a transition region. In the transition region such a parting burr is harmless, whereas parting burrs which are formed in a guide contact surface in the guide units according to the prior art have to be removed by additional post treatment.

It is thus particularly preferred that due to the above-described design the guide contact surface of the guide main portion and the guide contact surface of the guide front portion are formed without parting burrs during injection-molding.

Expediently, it is provided that the guide main portion has a curved shape which rises from the inside to the outside in the transverse or y-direction or in the direction of a bearing axis of the winding shaft. A free end of the guide main portion is expediently formed from the guide contact surface which is designed to be bulged. This design assists an injection-molding using a rotary slide or oblique slide of the injection-molding tool.

Preferably, the winding shaft bearing has a bearing pin, a strip containing a run-off edge or a curved run-off surface being able to be attached thereto, and the roller blind web sliding thereover when wound and unwound onto or from the winding shaft. The bearing pin is preferably arranged approximately parallel to the bearing pin of the winding shaft and spaced apart therefrom.

Expediently, the bearing pin is formed on a carrier plate on which the guide unit is integrally formed. The carrier plate may be adapted to a bottom surface of a guide channel of the guide rail for a planar transition at the same level.

The injection-molding tool according to the invention is characterized in that it has a rotary slide or oblique slide for molding the guide main portion of the guide unit formed with an undercut and, in particular, the guide contact surface of the guide main portion guiding the roller blind web or the roller blind edge strip.

An a preferred embodiment, it is provided that the injection-molding tool additionally has a slide, in particular an oblique slide or oblique ejector, for molding the guide contact surface of the guide front portion. The division of the molding of the guide front portion and the guide main portion between the two slides permits an improved injection-molding with undercuts on the components.

Expediently, the rotary slide is mounted so as to be pivotable about a pivot axis which is oriented on the winding shaft bearing in the longitudinal direction or x-direction or in a direction perpendicular to a bearing axis of the winding shaft. The axial and directional information are oriented relative to an x-y-z vehicle coordinate system which also applies to the winding shaft bearing corresponding to the installed state thereof on the vehicle roof.

It may also be provided that the additional slide or oblique slide may be mounted so as to be guided in a longitudinal movement, in particular in the longitudinal direction or x-direction, for the demolding. Such a longitudinal movement may be expedient in order to avoid a collision between the movement of the additional slide and the rotary slide.

Preferably, the rotary slide is arranged in a tool upper part or an upper shell of the injection-molding tool. Thus the space requirement for the cooling channels is not limited in the tool lower part or in the tool lower shell. Moreover, an automatic movement of the rotary slide may be carried out when opening and closing the injection-molding tool and the rotary movement may take place in the direction of the component.

The further parts of the winding shaft bearing may be formed integrally by the injection-molding tool, if required, by using further slides.

BRIEF DESCRIPTIONS OF THE DRAWINGS

The invention is described in more detail hereinafter by way of an exemplary embodiment of a winding shaft bearing and an injection-molding tool, with reference to the drawing, in which.

DETAILED DESCRIPTION

Figure 1:
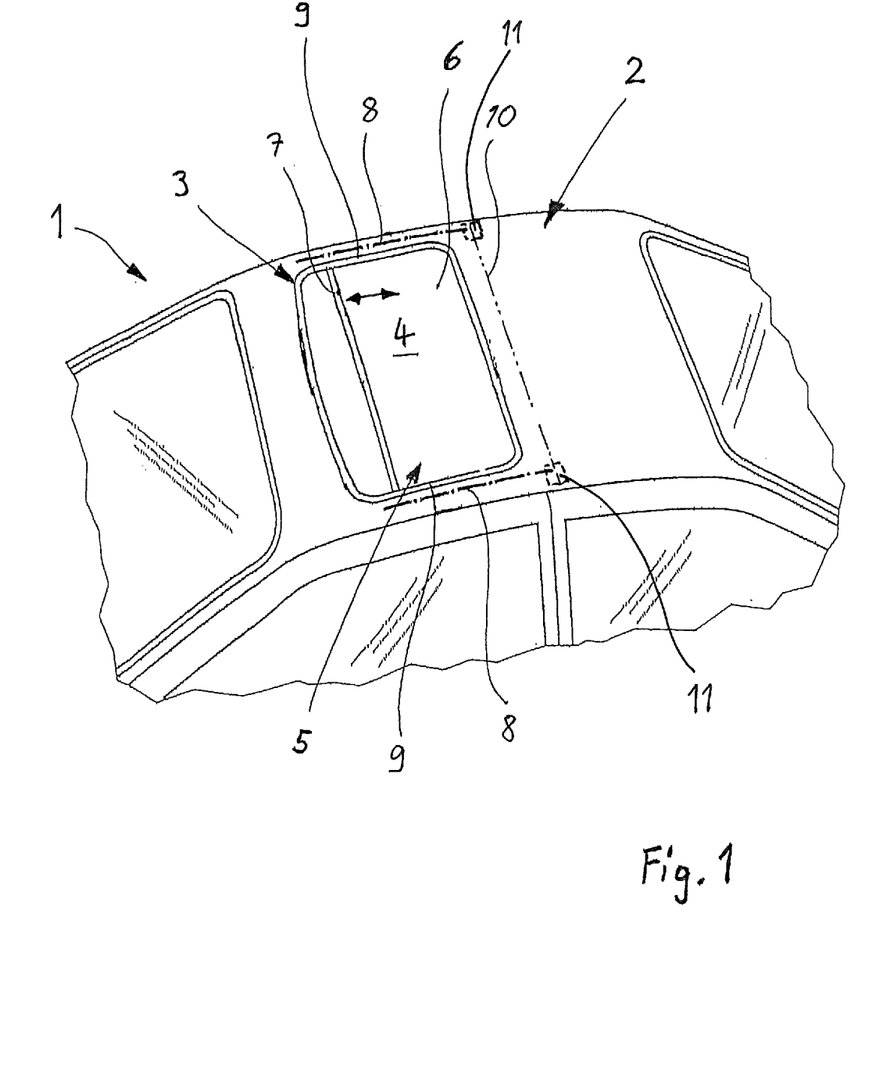
FIG. 1 shows in a plan view a vehicle with a vehicle roof which has a transparent roof portion and a vehicle roller blind device for shading the roof portion.
Figure 2:
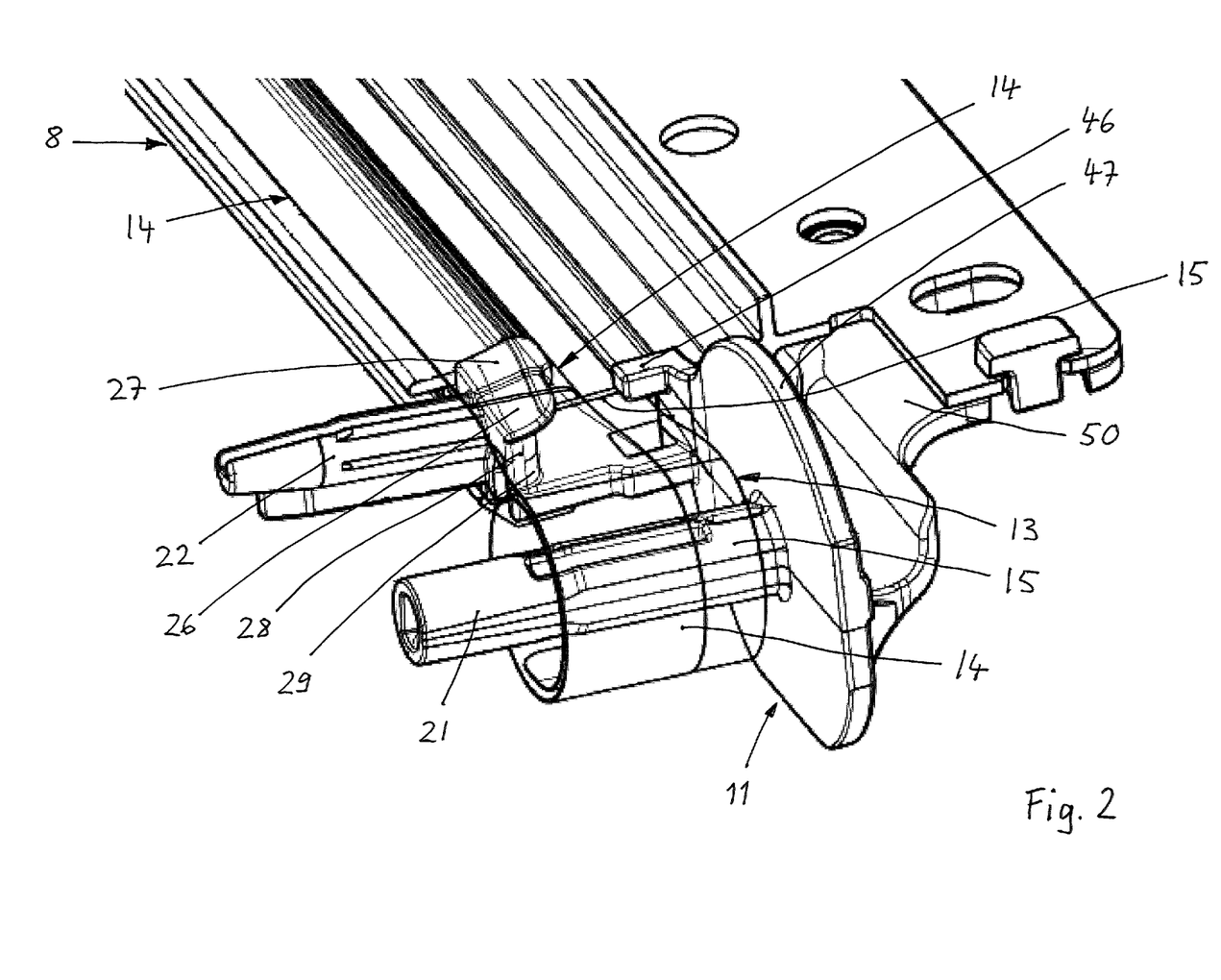
FIG. 2 shows in an isometric view a winding shaft bearing of the roller blind device with a roller blind web guided thereon.
Figure 3:
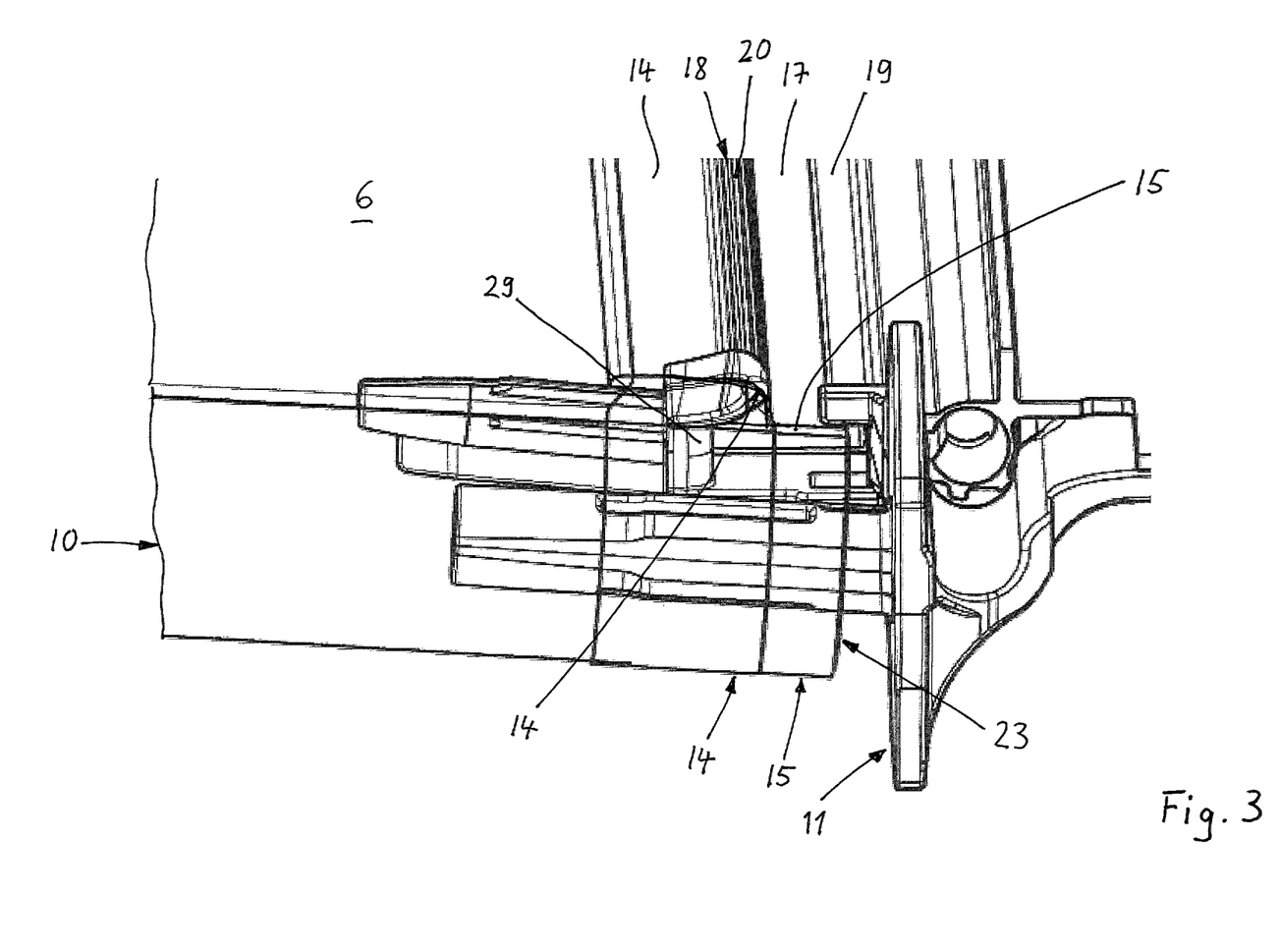
FIG. 3 shows in a further isometric view the winding shaft bearing of FIG. 2.

A vehicle 1, such as for example a passenger motor vehicle, has a vehicle roof 2 with a transparent roof portion 3 which is formed, for example, by a glass cover 4 of a sliding roof or a fixedly attached roof part or roof portion. A vehicle roller blind device 5 with a roller blind web 6 for shading the transparent roof portion 3 is arranged below the transparent roof portion 3. The roller blind web 6 which is produced, for example, from a fabric, a woven fabric or a film or the like, has at its free front edge or extension end a tensioning bow 7 which is displaceably mounted at the two lateral ends thereof on assigned lateral guide rails 8 which run in the roof longitudinal direction in the region below the lateral edges 9 of the transparent roof portion 3 in the movement direction of the tensioning bow 7 and the roller blind web 6. The vehicle roller blind device 5 has a winding shaft 10 which is arranged on the vehicle roof 2 in transverse orientation, for example behind the roof portion 3 to be shaded, and is rotatably mounted by means two winding shaft bearings 11 on the end side. The two winding shaft bearings 11 are arranged in the region of the rear ends of the two guide rails 8 relative to the roof longitudinal direction.

Figure 4:
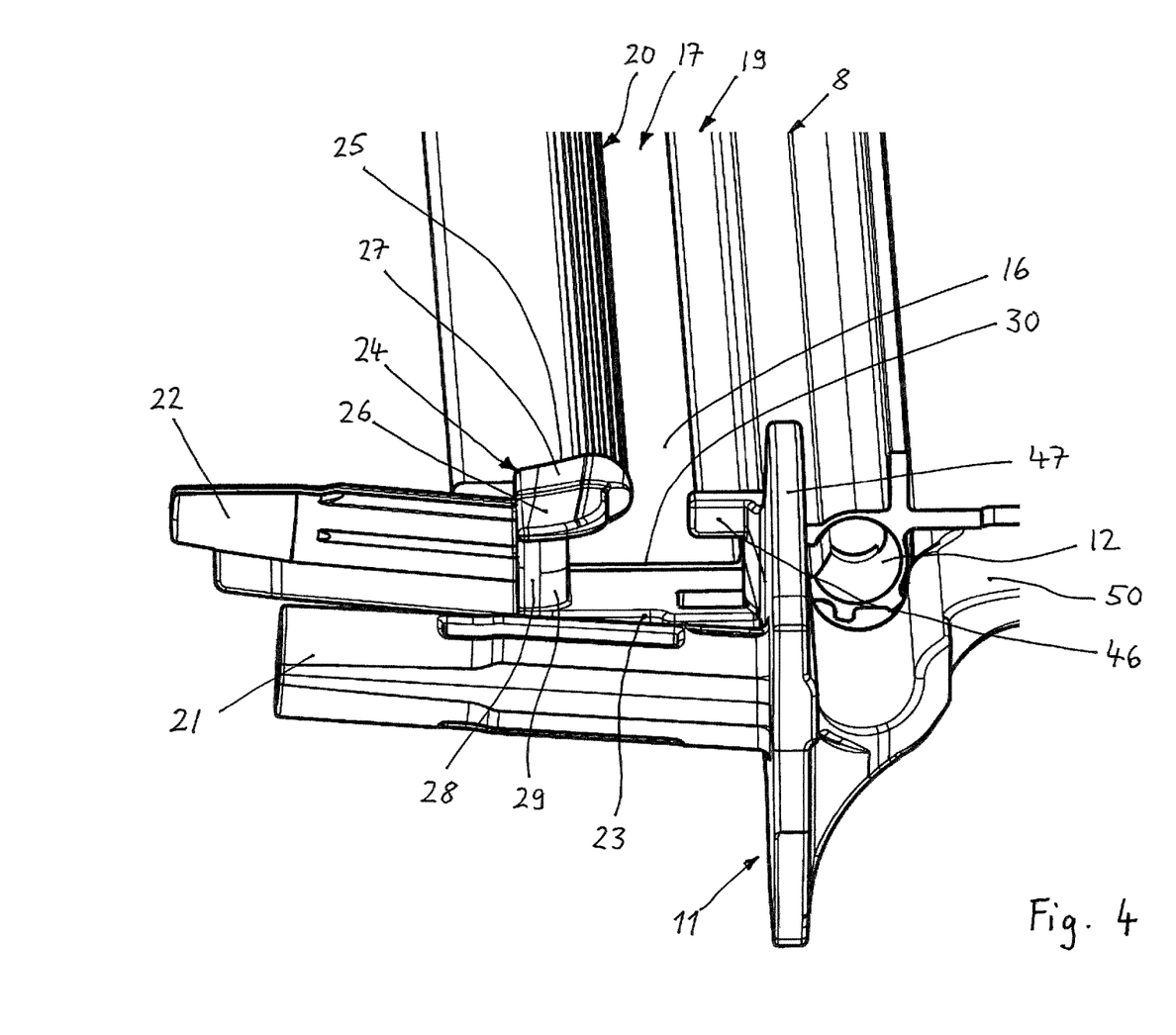
FIG. 4 shows in a further isometric view the winding shaft bearing of FIGS. 2 and 3 without a view of the roller blind web.

The roller blind web 6 is fixed to the winding shaft 10 on its rear edge or rear end and wound onto the winding shaft 10 which is pretensioned by spring force in the winding direction. Each guide rail 8 has a cable guide 12 (see FIG. 4) on which a drive cable (not shown) is displaceably mounted, and which on the one hand is connected to a bow slider which is arranged on the lateral end of the tensioning bow 7 and which is displaceably mounted on the guide rail 8, and on the other hand is adjustable by a drive motor. By means of the two drive cables, the tensioning bow 7 may be adjusted in the two guide rails 8 for winding and unwinding the roller blind web 6 onto or from the winding shaft 10, so that a desired shading position of the roller blind web 6 may be set.

The roller blind web 6 has on its two lateral edges 13 in each case a roller blind edge strip 14 which is reinforced on the edge side by a guide strip 15, for example a flexible metal strip. The roller blind edge strip 14 is received with the guide strip 15 in a guide channel 16 of the guide rail 8 and is longitudinally displaceable therein. The guide channel 16 is opened at the top by a slot 17 which is defined by an inner guide projection 18 and an outer guide projection 19, which oppose one another in the transverse direction. The roller blind edge strip 14 extends from the guide strip 15, which bears against the lower guide surfaces of the two guide projections 18 and 19, upwardly through the slot 17 and bears against a guide flank 20 of the guide rail 8, which is formed on the inner guide projection 18 and inwardly defines the slot 17 to the side in the transverse direction. The roller blind edge strip 14 is deflected via the curved or bulged guide flank 20 from its vertical orientation, for example, on the guide strip 15 into the horizontal plane of the roller blind web 6 and holds the roller blind web 6 tensioned due to the similar support on the opposing guide rail 8. The guide strip 15 accordingly has a width and flexural rigidity such that it is not able to be pulled upwardly by the tensioned roller blind web 6 out of the guide channel 16 through the slot 17 via its roller blind edge strip 14.

The winding shaft bearing 11 contains a bearing pin 21 on which the winding shaft 10 is rotatably mounted, as well as a bearing pin 22 to which a strip (not shown) containing a run-off edge is attached, the roller blind web 6 sliding over said strip when wound and unwound onto or from the winding shaft 10.

The bearing pin 22 is integrally formed on a carrier plate 23 of the winding shaft bearing 11 which is formed as a plastic injection-molding part. A guide unit 24 which feeds the roller blind edge strip 14 in the correct orientation of the guide rail 6 or the guide channel 16 when the roller blind web 6 is unwound from the winding shaft 10 is also formed integrally on the carrier plate 23. The guide unit 24 forms a part of an interface 25 of the winding shaft bearing 11, the winding shaft bearing 11 being thereby adapted to the guide rail 8 and fastened thereto. The guide unit 24 contains a guide front portion 26 which faces the winding shaft 10 and with which the roller blind web 6 has a first guide contact when unwound from the winding shaft 10. The guide unit 24 also contains a guide main portion 27 which faces the guide rail 8.

The guide front portion 26 and the guide main portion 27 are integrally formed on the upper end of a channel wall 28 which stands upright on the carrier plate 23 and at the interface 25 of the winding shaft bearing 11 is adapted to the shape of the guide channel 16 of the guide rail 8, and which has a vertical wall surface for a planar transition without an offset to the assigned lateral wall of the guide channel 16. The channel wall 28 is rounded or chamfered on its end oriented toward the winding shaft 10 so that the funnel-shaped, tapering wall surface forms a centering feed 29 for the guide strip 15. The carrier plate 23 adjoins a bottom surface 30 of the guide channel 16 of the guide rail 8 for a planar transition at the same level.

Figure 5:
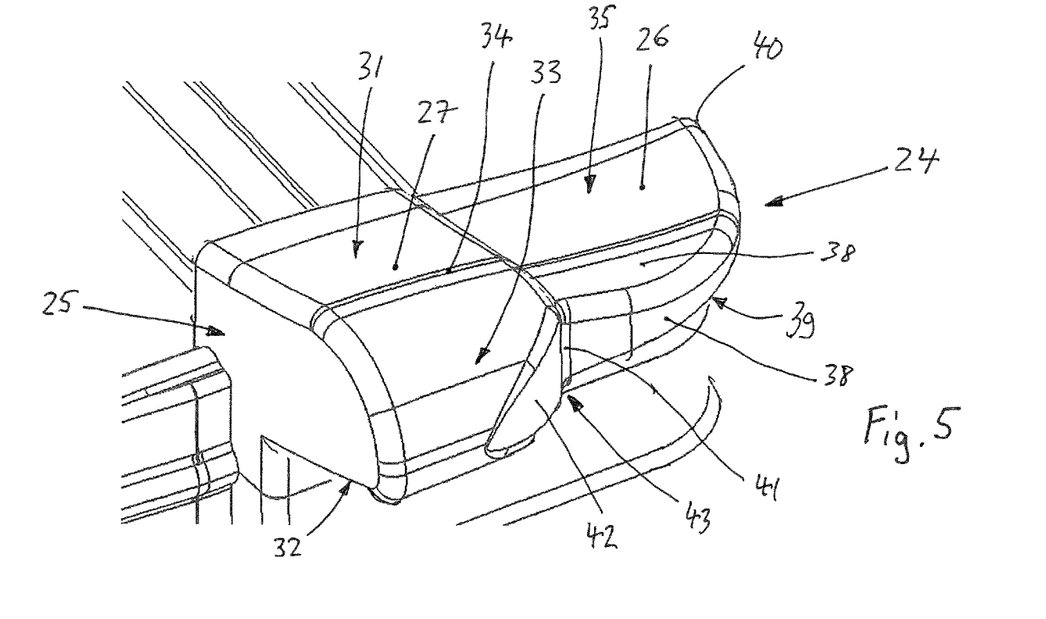
FIG. 5 shows in an isometric view a guide unit of the winding shaft bearing guiding the roller blind web.
Figure 6:
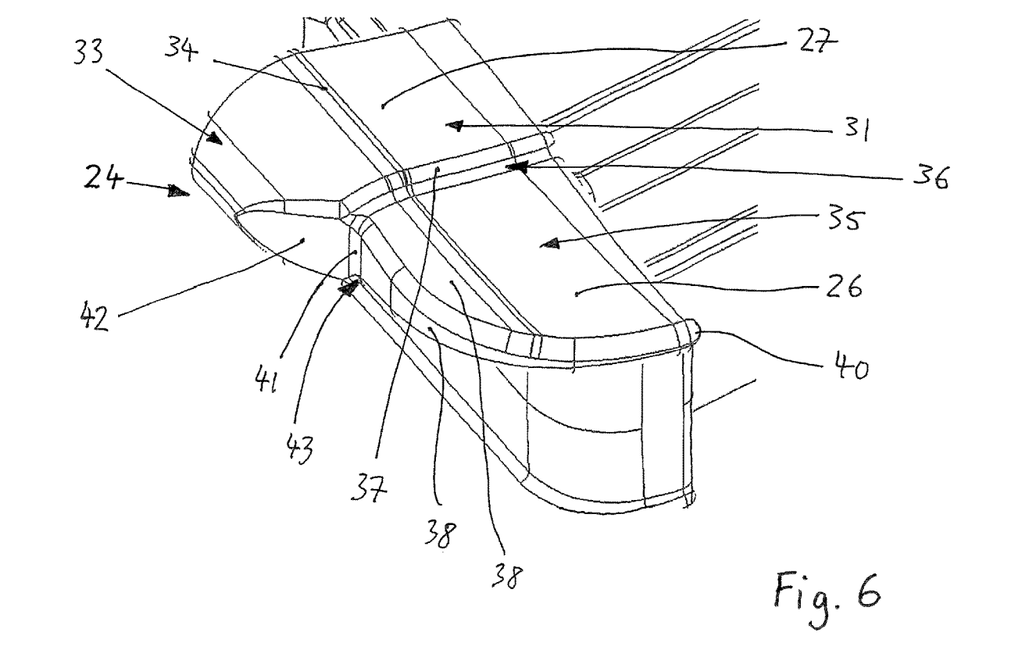
FIG. 6 shows in a further isometric view the guide unit of the winding shaft bearing shown in FIG. 5.

The guide main portion 27 of the guide unit 24 extends from the channel wall 28 starting with an upwardly oblique inclination over a portion of the carrier plate 23, wherein an upper face 31 and a lower face 32 of the guide main portion 27 (see FIGS. 5 and 6) which are formed to be substantially planar, run approximately parallel to one another or in particular rise outwardly with a slight curvature in the transverse direction. Moreover, at least the upper face 31 and optionally also the lower face 32 may rise in the pull-out direction of the roller blind web 6, whereby the roller blind edge strip 14 is brought to its vertical position adapted to the guide flank 20 of the guide rail 8. The guide main portion 27 is formed on its protruding free end with a guide contact surface 33, which bulges from its upper face 31 to its lower face 32 and against which the roller blind edge strip 14 bears, whilst the guide strip 15 is tensioned by the roller blind edge strip 14 against the lower face 32. The roller blind edge strip 14 which is tensioned via the roller blind web 6 in the transverse direction comes into contact with the guide contact surface 33 on the upper face as far as an elevation line 34 which represents the highest elevation of the guide main portion 27, and starting therefrom the roller blind web 6 or the roller blind edge strip 14 extends tangentially and in an exposed manner. The bulged guide contact surface 33 has a design and position adapted to the adjoining bulged guide flank 20 of the inner guide projection 18 of the guide rail 8, so that the roller blind edge strip 14 may slide from the guide contact surface 33 to the guide flank 20, at the same level and without an offset, and also in the opposing direction.

The guide front portion 26 of the guide unit 24 is arranged in the pull-out direction of the roller blind web 6 directly upstream of the guide main portion 27. The guide front portion 26 has smaller dimensions relative to the guide main portion 27, in particular in the vertical or z-direction and transverse direction or y-direction, and assists the initial tensioning of the roller blind edge strip 14 from its flat winding position with a fold on the winding shaft 10, and for feeding the roller blind edge strip 14 to the guide main portion 27. A flat upper face 35 of the guide front portion 26 is oriented substantially parallel to the upper face 31 of the guide main portion 27 but is set back in the vertical direction relative to the upper face 31 of the guide main portion 27 so that an upper transition region 36 is formed, said upper transition region having, for example, the shape of a channel or groove with a chamfer 37 on the adjoining elevated guide main portion 27 and thus forming the defined transition from the upper face 35 of the guide front portion 26 to the upper face 31 of the guide main portion 27 and thus the vertical offset.

Moreover, the guide front portion 26 has a guide contact surface 38 which is arranged in the pull-out direction of the roller blind web 6 upstream of the guide contact surface 33 of the guide main portion 27 and, when viewed from the top, contains a curved edge which connects the upper face 35 to a lower face 39 of the guide front portion 26. The guide contact surface 38 runs approximately linearly on the edge from a front starting point 40 and with chamfers to the upper face 35 and to the lower face 39 outwardly in the transverse direction and in the longitudinal direction as far as the transition region 36 and terminates in a vertical transition region 41 with an oblique vertically located guide chamfer 42 on the guide main portion 27. The upper face 35 and the lower face 39 of the guide front portion 26 are formed with an increasing spacing in the pull-out direction of the roller blind web 6, so that the guide front portion 26 has a slight wedge shape and the guide contact surface 38 thereof widens toward the vertical transition region 41.

A lower transition region 43 which is substantially equal to the upper transition region 36 is formed between the lower face 39 of the guide front portion 26 and the lower face 32 of the guide main portion 27 which is elevated relative thereto.

The roller blind edge strip 14 of the roller blind web 6 which is guided in sliding contact on the guide front portion 26 and on the guide main portion 27 and, in particular, on the guide contact surfaces 33 or 38, is not in contact with the guide front portion 26 and with the guide main portion 27 at the transition regions 36, 41 and 43.

Figure 10:
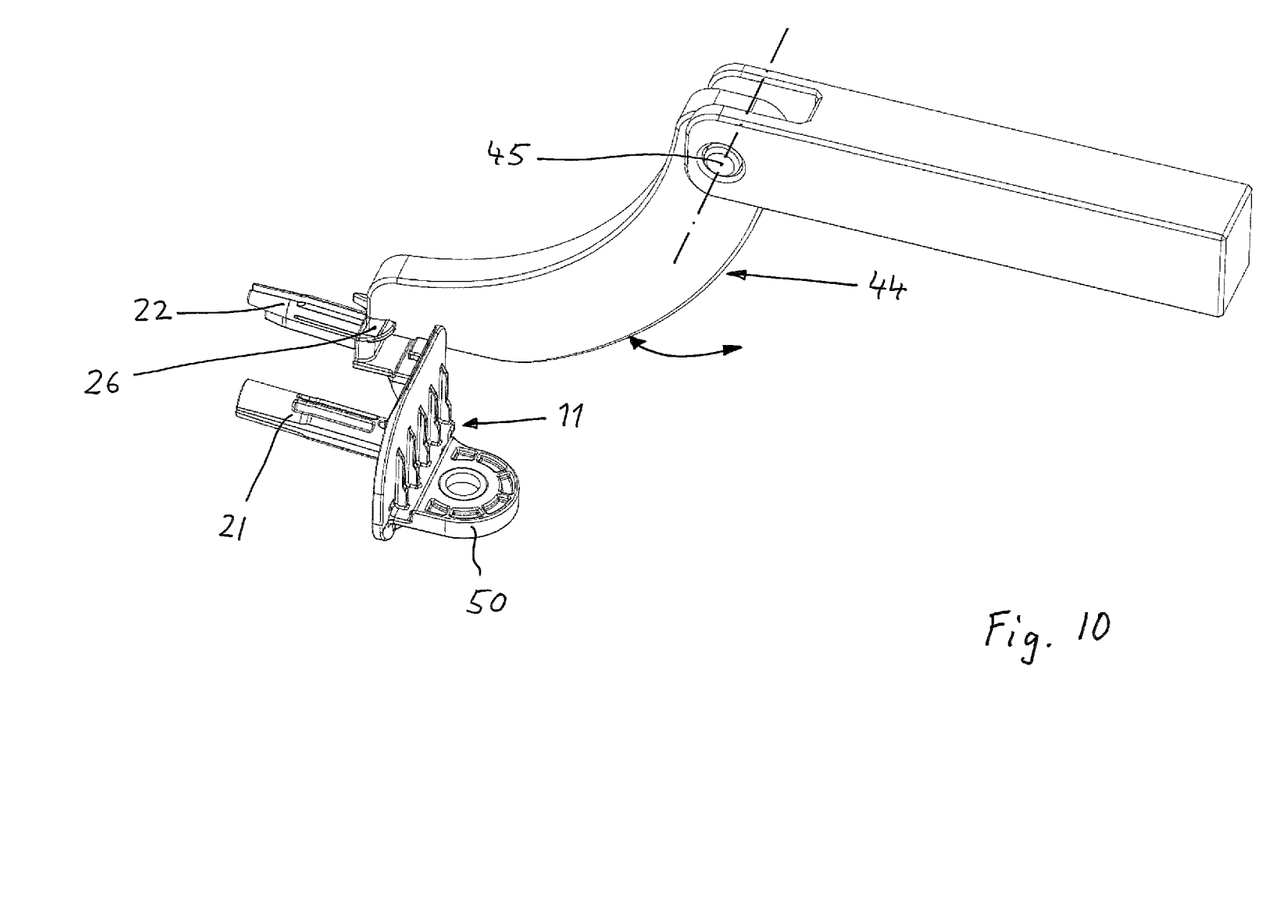
FIG. 10 shows in an isometric view the winding shaft bearing with a rotary slide of an injection-molding tool.

An injection-molding tool for injection-molding the winding shaft bearing 11 with an integrally injection-molded guide unit 24 made of plastics, in particular a thermoplastic material such as PP or PA6 or even PU, contains a rotary slide 44 (see schematic view of FIG. 10) which is mounted in an upper shell of the injection-molding tool so as to be pivotable about a pivot axis 45, such that it may be pivoted out on the winding shaft bearing 11 in a transverse plane in the y-direction or in the direction of the bearing axis of the winding shaft 10 for the demolding. The rotary slide 44 molds the guide main portion 27 as far as the transition regions 36, 41 and 43. Thus, in particular, the bulged guide contact surface 33 of the guide main portion 27 is entirely formed inside a mold cavity of the rotary slide 44 and thus without a parting burr relative to an adjacent tool part or slide. The upper face 31 and the lower face 32 of the guide main portion 27 are formed as surfaces with a curvature, such that the center of curvature of the respective radius of curvature coincides with the pivot axis 45 of the rotary slide 44. As a result, a demolding is possible by the pivoting movement of the rotary slide 44. In this manner, an undercut may be molded in a simple manner on the guide main portion 27 relative to the upper shell of the injection-molding tool. The rotary slide 44 pivots out during its demolding movement in front of other components of the winding shaft bearing 11, for example in front of a guide projection 46 which protrudes above the carrier plate 23 from a bearing wall 47 toward the guide front portion 26 and which is adapted to the outer guide projection 19 of the guide rail 8.

Figure 7:
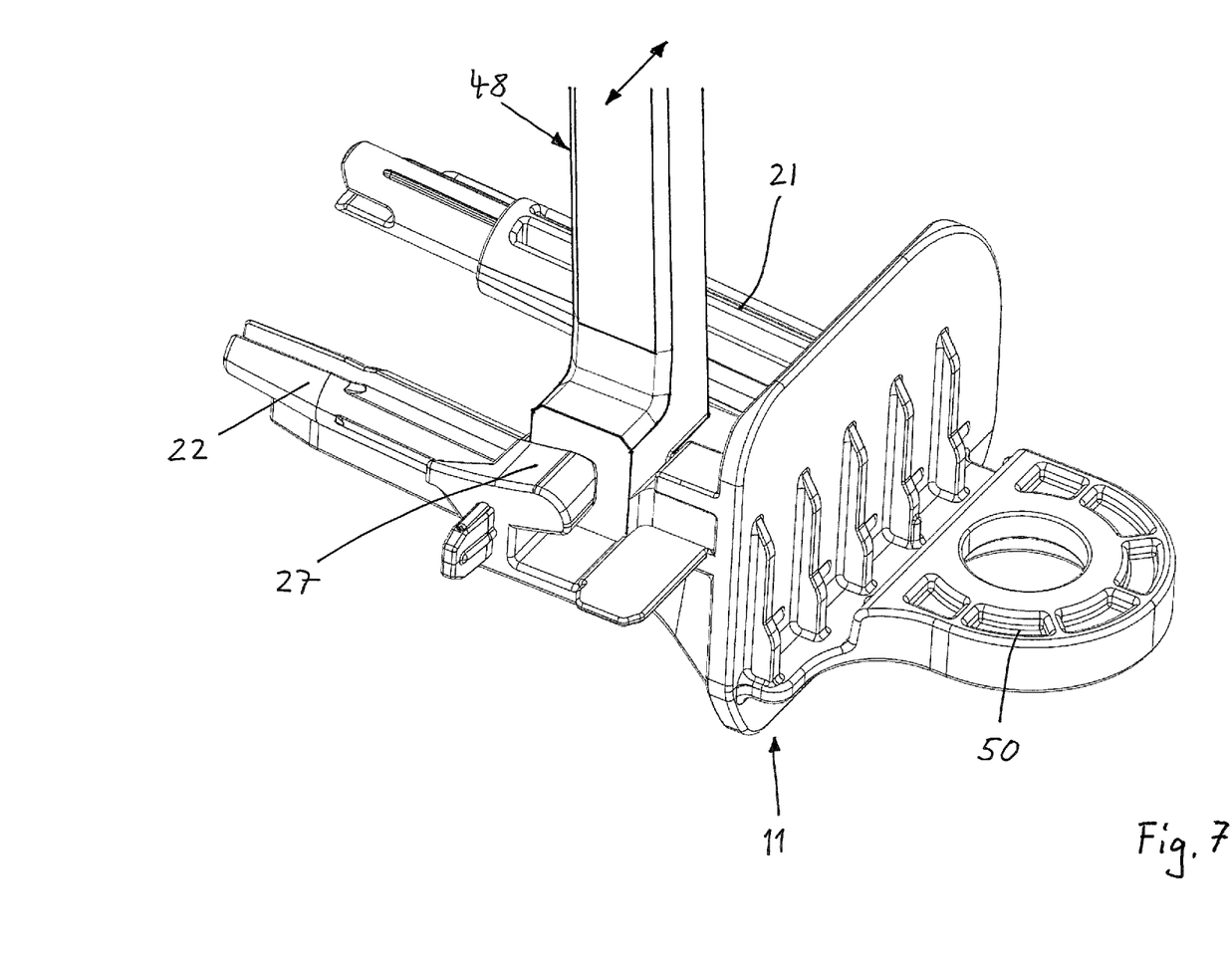
FIG. 7 shows in a isometric view the winding shaft bearing with a slide of an injection-molding tool.
Figure 8:
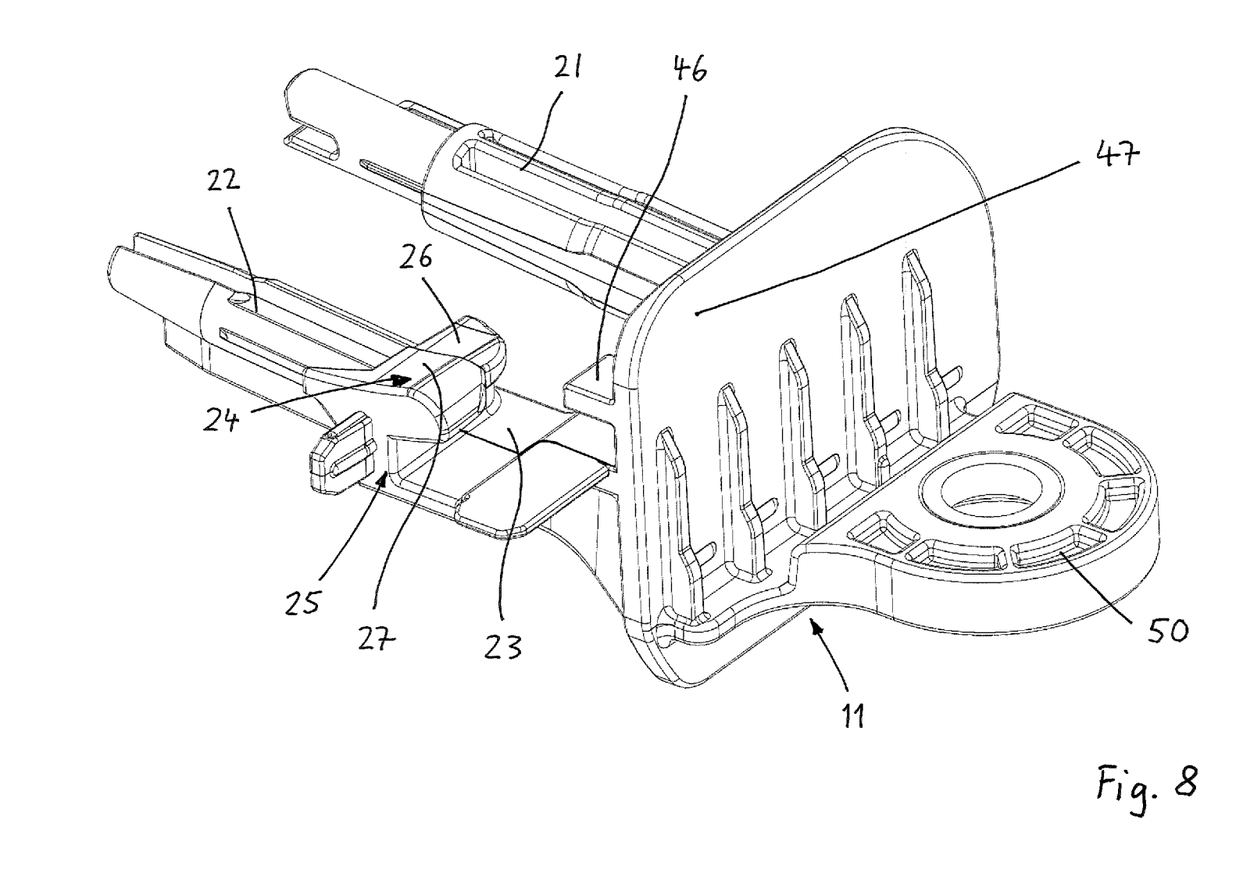
FIG. 8 shows in a further isometric view the winding shaft bearing.
Figure 9:
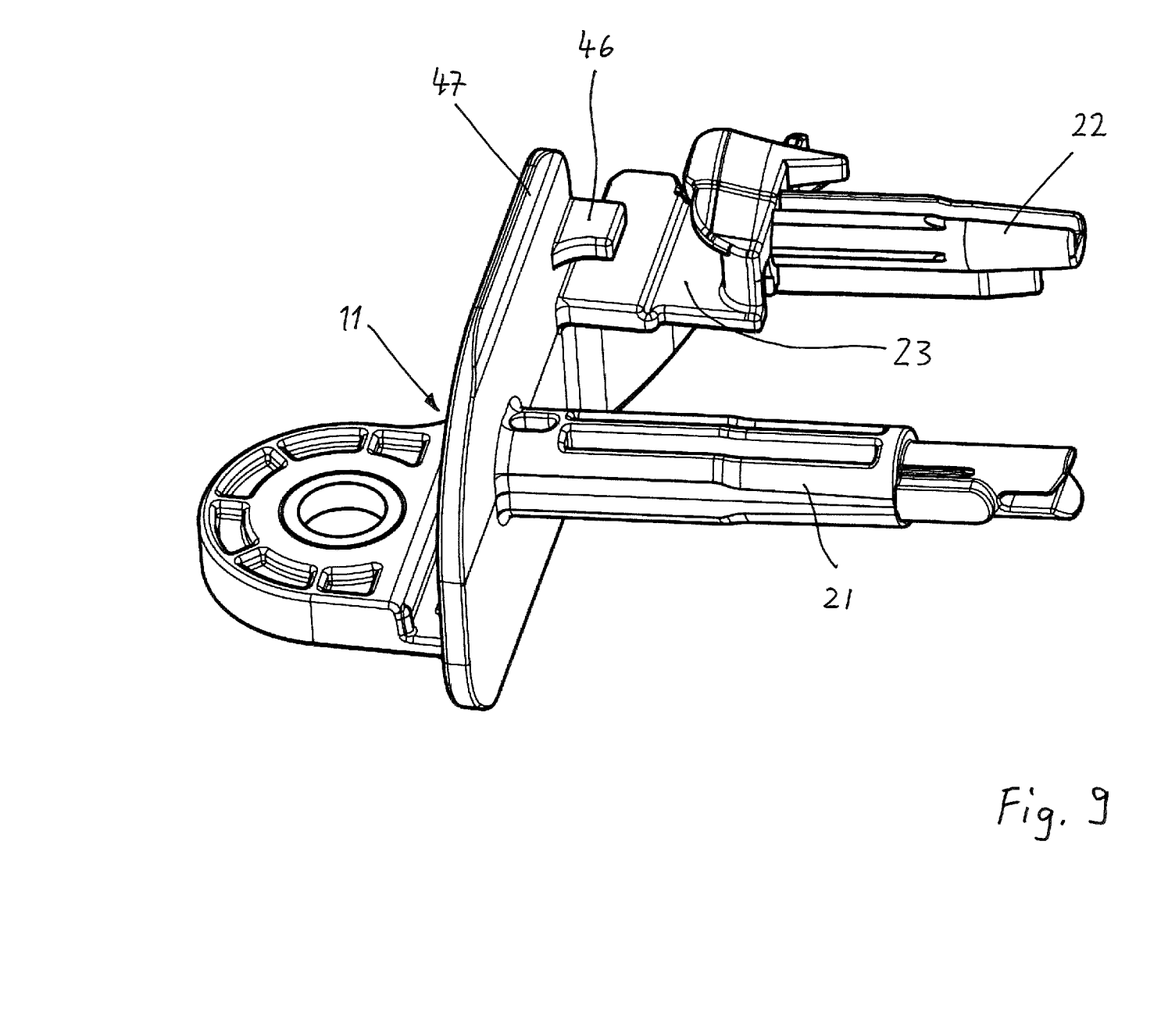
FIG. 9 shows in a further isometric view the winding shaft bearing.

A slide 48 of the injection-molding tool, such as for example an oblique slide (see FIG. 7) or even a rotary slide, is provided for molding the guide front portion 26 and contains a corresponding mold cavity which forms at least the guide contact surface 38 without a parting burr. The slide 48 preferably mounted so as to be guided in a longitudinal movement in the longitudinal direction or x-direction for the demolding. The slight wedge shape of the guide front portion 26 serves for simple demolding by the longitudinal movement of the slide 48. The slide 48 also serves for molding an undercut between the guide projection 46 and the carrier plate 23.

Figure 11:
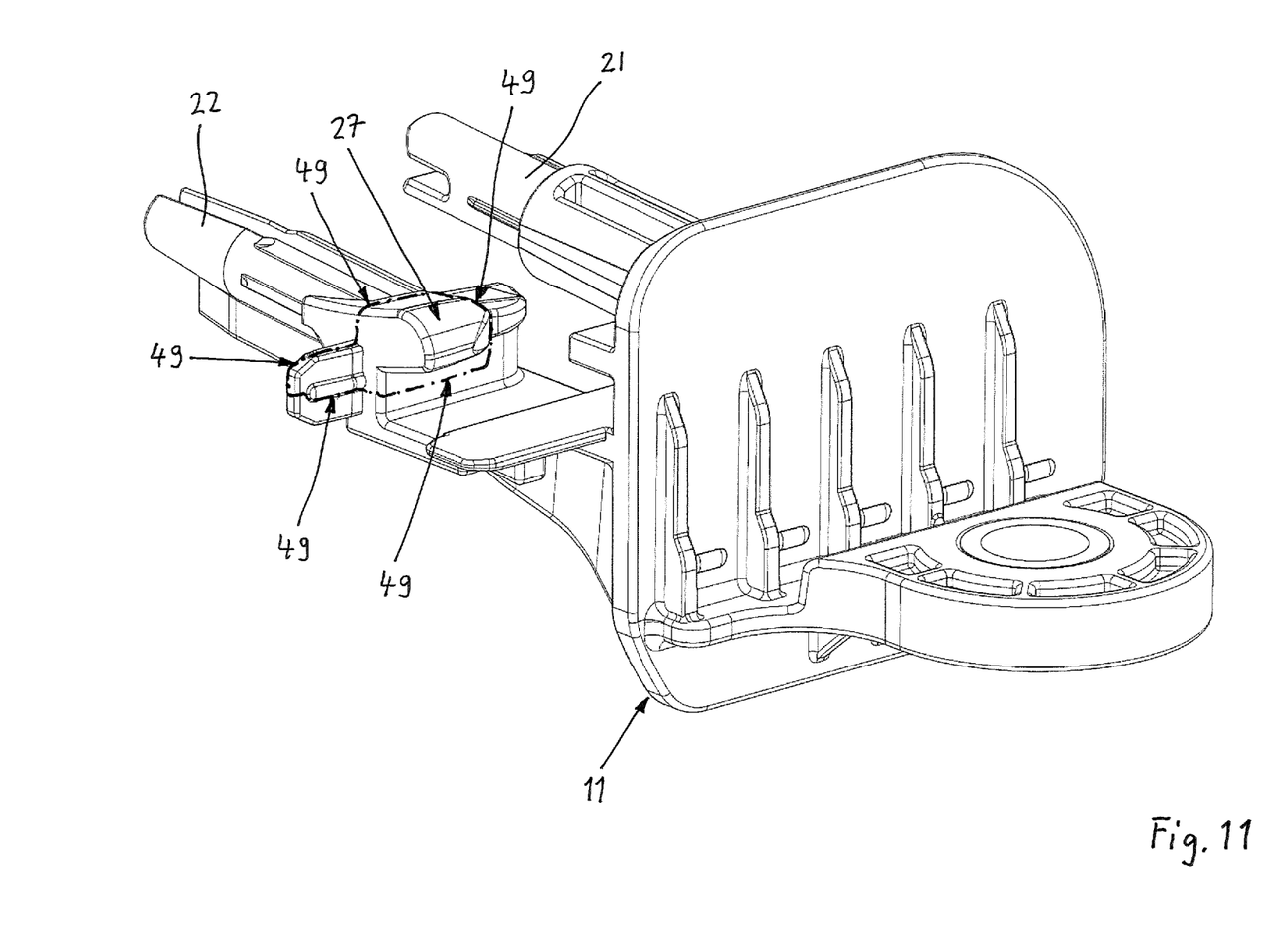
FIG. 11 shows in an isometric view the winding shaft bearing with a dashed-dotted line which represents the path of a parting burr formed by the rotary slide on the winding shaft bearing.

The rotary slide 44 and the slide or oblique slide 48 adjoin one another such that a parting burr occurring between the rotary slide 44 and the slide 48 may be arranged only in the respective transition region 36, 41 and 43. The sliding guidance of the roller blind edge strip 14 and the guide strip 15 is thus not able to be impaired by such a parting burr. FIG. 11 shows by means of a dashed-dotted line 49 the path of the parting lines assigned to the rotary slide 44 or the parting burrs formed thereby.

The further parts of the winding shaft bearing 11 are integrally formed by the injection-molding tool, by using further slides as required.

Thus the injection-molding tool permits the integral injection-molding of the winding shaft bearing 11 with the guide unit 24, wherein at least the relevant sliding surfaces and guide contact surfaces of the guide unit 24 may be produced without a pasting burr.

FIGS. 2 to 4 and 7 to 11 show the winding shaft bearing 11 with two different designs of fastening flange 50 for connecting the winding shaft bearing 11 to one respective guide rail 8.

The invention claimed is:

1. A winding shaft bearing of a winding shaft of a vehicle roller blind device,
said winding shaft carrying a roller blind web,
wherein the winding shaft bearing has a guide unit which guides a roller blind edge strip of the unwound roller blind web to a guide rail adjoining the winding shaft bearing,
wherein the guide unit has a guide front portion facing the winding shaft and a guide main portion facing the guide rail, a guide contact surface of the guide main portion guiding the roller blind edge strip to the guide rail is elevated with respect to a guide contact surface of the guide front portion guiding the roller blind edge strip from or to the winding shaft and the winding shaft bearing is formed integrally with the guide front portion and the guide main portion of the guide unit as a plastic injection-molded part in an injection-molding tool; and
wherein at least one transition region, which is without contact with the roller blind edge strip, is formed between the guide contact surface of the guide front portion and the guide contact surface of the guide main portion.

2. The winding shaft bearing as claimed in claim 1, wherein the guide contact surface of the guide main portion and the guide contact surface of the guide front portion are formed without parting burrs during injection-molding.

3. A winding shaft bearing of a winding shaft of a vehicle roller blind device,
said winding shaft carrying a roller blind web,
wherein the winding shaft bearing has a guide unit which guides a roller blind edge strip of the unwound roller blind web to a guide rail adjoining the winding shaft bearing,
wherein the guide unit has a guide front portion facing the winding shaft and a guide main portion facing the guide rail, a guide contact surface of the guide main portion guiding the roller blind edge strip to the guide rail is elevated with respect to a guide contact surface of the guide front portion quiding the roller blind edge strip from or to the winding shaft and the winding shaft bearing is formed integrally with the guide front portion and the guide main portion of the guide unit as a plastic injection-molded part in an injection-molding tool,
wherein the guide main portion has a curved shape which rises from the inside to the outside in the transverse or y-direction or in the direction of a bearing axis of the winding shaft, and terminates in the guide contact surface which is formed in a bulged manner.

4. A winding shaft bearing of a winding shaft of a vehicle roller blind device,
said winding shaft carrying a roller blind web,
wherein the winding shaft bearing has a guide unit which guides a roller blind edge strip of the unwound roller blind web to a guide rail adjoining the winding shaft bearing,
wherein the guide unit has a guide front portion facing the winding shaft and a guide main portion facing the guide rail, a quide contact surface of the guide main portion guiding the roller blind edge strip to the guide rail is elevated with respect to a guide contact surface of the guide front portion guiding the roller blind edge strip from or to the winding shaft and the winding shaft bearing is formed integrally with the guide front portion and the guide main portion of the guide unit as a plastic injection-molded part in an injection-molding tool,
wherein the winding shaft bearing contains a bearing pin, a strip containing a run-off edge being able to be attached thereto, and the roller blind sliding thereover when wound and unwound onto or from the winding shaft.

5. The winding shaft bearing as claimed in claim 4, wherein the bearing pin is formed on a carrier plate on which the guide unit is integrally formed.

6. The winding shaft bearing as claimed in claim 5, wherein the carrier plate is adapted to a bottom surface of a guide channel of the guide rail for a planar transition at the same level.

7. An injection-molding tool for injection-molding a winding shaft bearing as claimed in claim 1, wherein the injection-molding tool has a rotary slide or oblique slide for molding the guide main portion of the guide unit formed with an undercut and, the guide contact surface of the guide main portion guiding the roller blind web or the roller blind edge strip.

8. The injection-molding tool as claimed in claim 7, wherein it additionally has an oblique slide or oblique ejector, for molding the guide contact surface of the guide front portion.

9. The injection-molding tool as claimed in claim 7, wherein the rotary slide is mounted so as to be pivotable about a pivot axis which is oriented on the winding shaft bearing in the longitudinal direction or x-direction or in a direction perpendicular to a bearing axis of the winding shaft.

10. The injection-molding tool as claimed in claim 8, wherein the additional slide or oblique slide is mounted so as to be guided in a longitudinal movement in the longitudinal direction or x-direction, for the demolding.

11. The injection-molding tool as claimed in claim 7, wherein the rotary slide is arranged in a tool upper part of the injection-molding tool.

\* \* \* \* \*